United States Patent
Saruwatari

(10) Patent No.: US 7,315,424 B2
(45) Date of Patent: Jan. 1, 2008

(54) ZOOM LENS AND IMAGE PICKUP APPARATUS HAVING THE SAME

(75) Inventor: Hiroshi Saruwatari, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/627,507

(22) Filed: Jan. 26, 2007

(65) Prior Publication Data

US 2007/0201146 A1    Aug. 30, 2007

(30) Foreign Application Priority Data

Feb. 27, 2006    (JP) .............................. 2006-050269

(51) Int. Cl.
*G02B 15/14*    (2006.01)
(52) U.S. Cl. ...................... 359/687; 359/557; 359/683; 359/690
(58) Field of Classification Search ................ 359/554, 359/557, 683, 687, 690
See application file for complete search history.

(56) References Cited

U.S. PATENT DOCUMENTS

| | | |
|---|---|---|
| 4,913,535 A | 4/1990 | Robb |
| 6,999,240 B2 * | 2/2006 | Yamada et al. ............. 359/683 |
| 7,088,521 B2 | 8/2006 | Hamano et al. |
| 7,139,130 B2 * | 11/2006 | Yamada ....................... 359/687 |

* cited by examiner

*Primary Examiner*—Scott J. Sugarman
(74) *Attorney, Agent, or Firm*—Canon USA, Inc., IP Divison

(57) ABSTRACT

At least one exemplary embodiment is directed to a zoom lens configured to correct chromatic aberration and having a high optical performance over the entire zoom range. The zoom lens includes, in order from an object side to an image side, a first lens unit of positive refractive power, a second lens unit of negative refractive power, and a third lens unit of positive refractive power. During zooming, an interval between respective adjacent lens units varies. The third lens unit includes an optical element made of a solid material having an Abbe number (νd) and a relative partial dispersion (θgF) satisfying the following condition:

$$\theta gF - (-1.665 \times 10^{-7} \cdot \nu d^3 + 5.213 \times 10^{-5} \cdot \nu d^2 - 5.656 \times 10^{-3} \cdot \nu d + 0.755) > 0.$$

14 Claims, 13 Drawing Sheets

ZOOM LENS AND IMAGE PICKUP APPARATUS HAVING THE SAME

BACKGROUND OF THE INVENTION

1. Field of the Invention

The present invention relates to a zoom lens and an image pickup apparatus having the zoom lens, and more particularly, though not exclusively, a zoom lens that can be used, for example, in an image pickup apparatus.

2. Description of the Related Art

Recently, a solid-state image sensor that can be used in an image pickup apparatus such as a digital camera has a large number of pixels. In addition, the market has desired that a zoom lens for an image pickup apparatus using an image sensor having a large number of pixels has a specification with which various aberrations occurring with respect to a single color and chromatic aberrations are sufficiently corrected. Particularly, for a zoom lens having a high zoom ratio and a long focal length at the telephoto end, the market has desired to reduce a secondary spectrum in addition to achromatism of a first-order spectrum.

In order to correct chromatic aberration, U.S. Pat. No. 4,913,535 discusses an optical system using a liquid material that has a high degree of dispersion and extraordinary partial dispersion as optical characteristics.

In addition, U.S. Pat. No. 7,088,521 discusses a zoom lens whose chromatic aberration at the telephoto end is corrected and reduced by utilizing dispersion characteristics of an indium tin oxide (ITO) resin that uses an optical element in which ITO particles are dispersed.

In an optical system that uses a liquid material having an achromatic effect, a structure for sealing the liquid material is necessary. Accordingly, manufacture of such an optical system is complicated. In addition, characteristics such as a refractive index and dispersion characteristics vary due to a change in temperature, which makes it difficult to maintain excellent environment tolerance.

SUMMARY OF THE INVENTION

At least one exemplary embodiment is directed to a zoom lens that can be used in an image pickup apparatus (e.g., a digital still camera, a video camera, a film camera, and other image pickup apparatuses as known by one of ordinary skill in the relevant arts).

According to an aspect of at least one exemplary embodiment of the present invention, a zoom lens includes, in order from an object side to an image side: a first lens unit having a positive refractive power; a second lens unit having a negative refractive power; and a third lens unit having a positive refractive power. An interval between respective adjacent lens units varies during zooming. The third lens unit includes an optical element made of a solid material having an Abbe number (vd) and a relative partial dispersion (θgF) satisfying the following condition:

$$\theta gF - (-1.665 \times 10^{-7} \cdot vd^3 + 5.213 \times 10^{-5} \cdot vd^2 - 5.656 \times 10^{-3} \cdot vd + 0.755) > 0.$$

According to an exemplary embodiment of the present invention, a zoom lens whose chromatic aberrations are corrected and/or reduced and which has a high optical performance in the entire zoom range and an image pickup apparatus that uses the zoom lens can be implemented.

Further features of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate some exemplary embodiments and features of the invention and, together with the description, serve to explain some of the principles of the invention.

DETAILED DESCRIPTION OF THE EMBODIMENTS

Figure 1:
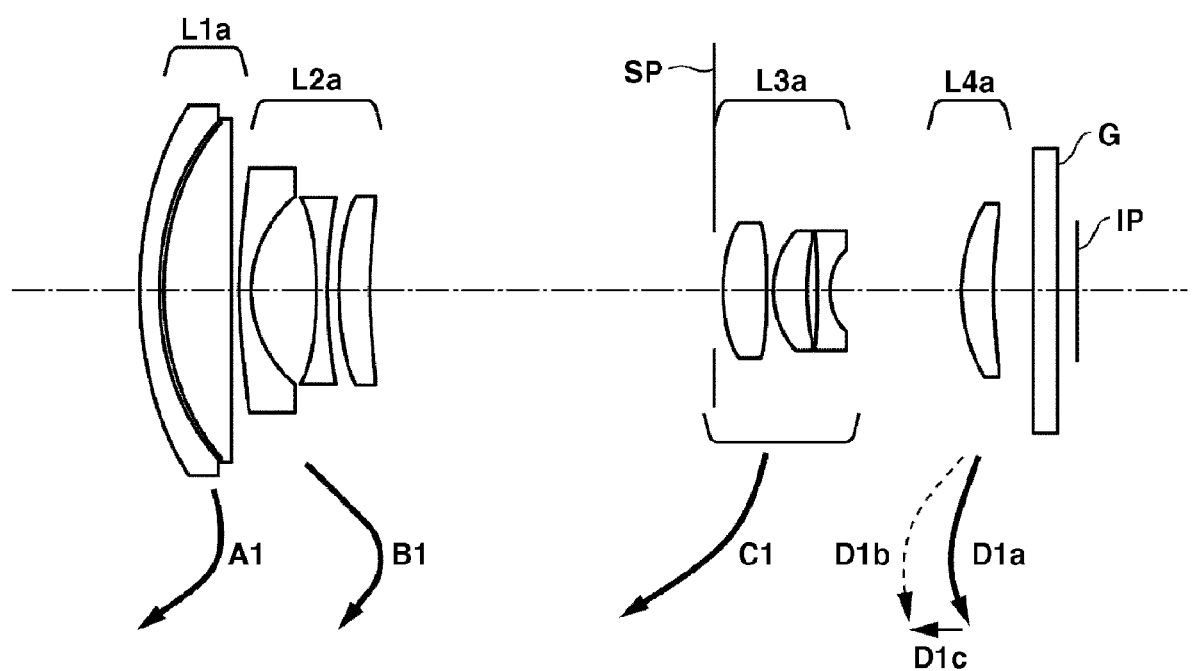
FIG. 1 is a cross section of a zoom lens at a wide-angle end according to a first exemplary embodiment of the present invention.

Various exemplary embodiments of the present invention will now be described in detail with reference to the drawings. It should be noted that the relative arrangement of the components, the numerical expressions, and numerical values set forth in these embodiments do not limit the scope of the present invention unless it is specifically stated otherwise.

The following description of at least one exemplary embodiment is merely illustrative in nature and is in no way intended to limit the invention, its application, or uses.

Processes, techniques, apparatus, and materials as known by one of ordinary skill in the relevant art may not be discussed in detail but are intended to be part of the enabling description where appropriate, for example the fabrication of the lens elements and their materials.

In all of the examples illustrated and discussed herein any specific values, for example the zoom ratio and F number, should be interpreted to be illustrative only and non limiting. Thus, other examples of the exemplary embodiments could have different values.

Notice that similar reference numerals and letters refer to similar items in the following figures, and thus once an item is defined in one figure, it may not be discussed for following figures.

Note that herein when referring to correcting or corrections of an error (e.g., an aberration), a reduction of the error and/or a correction of the error is intended.

Figure 2:
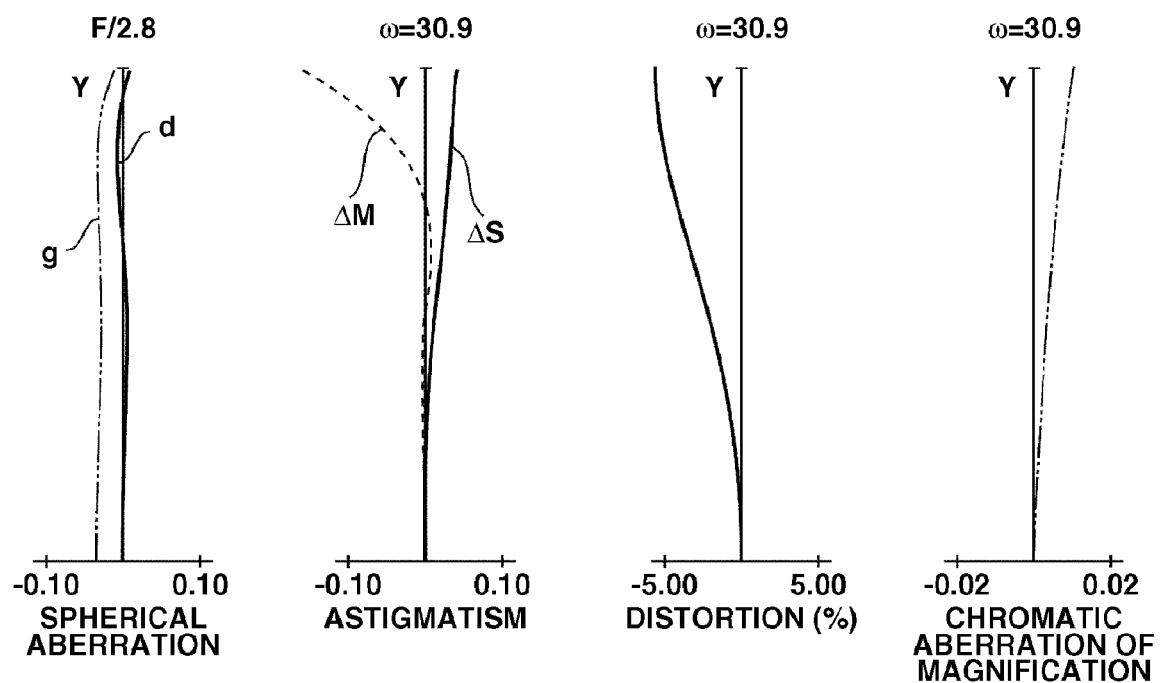
FIG. 2 is a chart illustrating various aberrations at a wide-angle end according to the first exemplary embodiment of the present invention.
Figure 3:
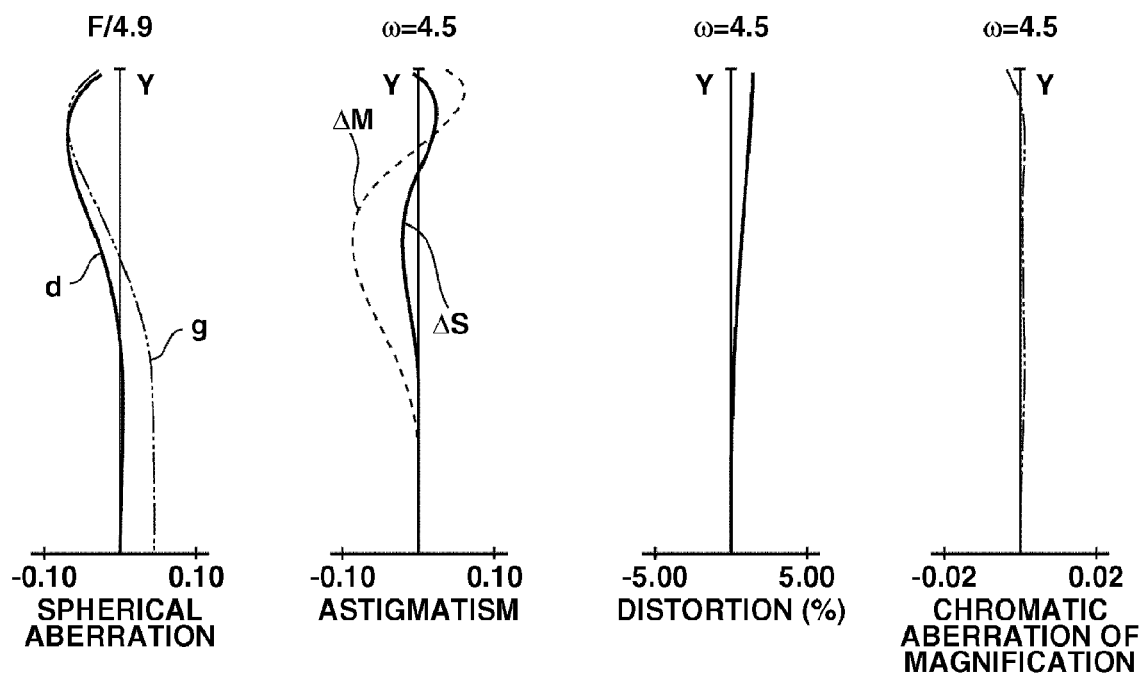
FIG. 3 is a chart illustrating various aberrations at a telephoto end according to the first exemplary embodiment of the present invention.

FIG. 1 is a diagram that illustrates a cross section of a zoom lens at the wide-angle end according to a first exemplary embodiment of the present invention. FIG. 2 and FIG. 3 respectively show an aberration chart at the wide-angle end and at a telephoto end of the zoom lens according to the first exemplary embodiment.

Figure 4:
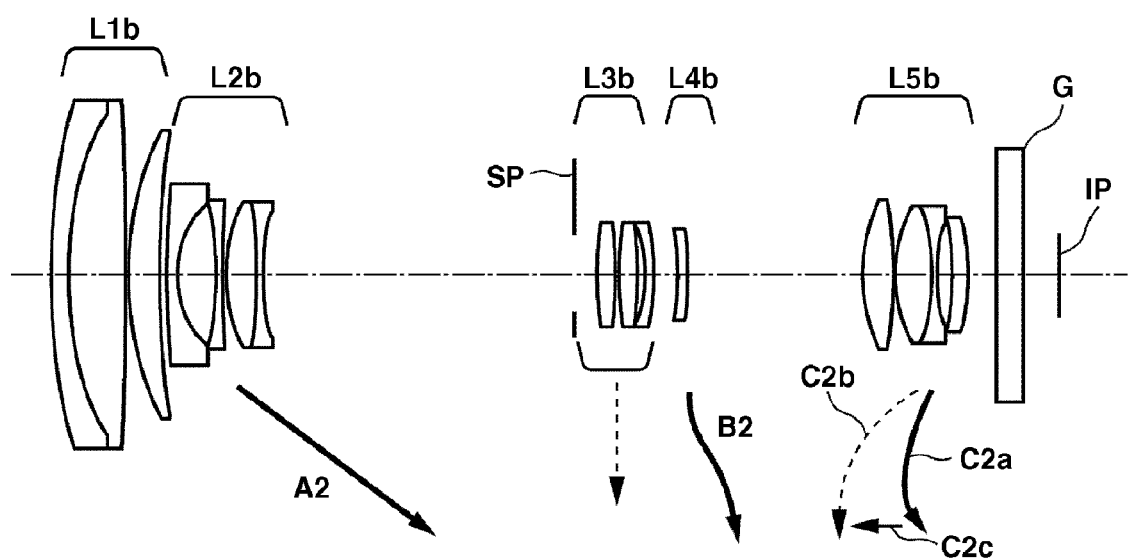
FIG. 4 is a cross section of a zoom lens at a wide-angle end according to a second exemplary embodiment of the present invention.
Figure 5:
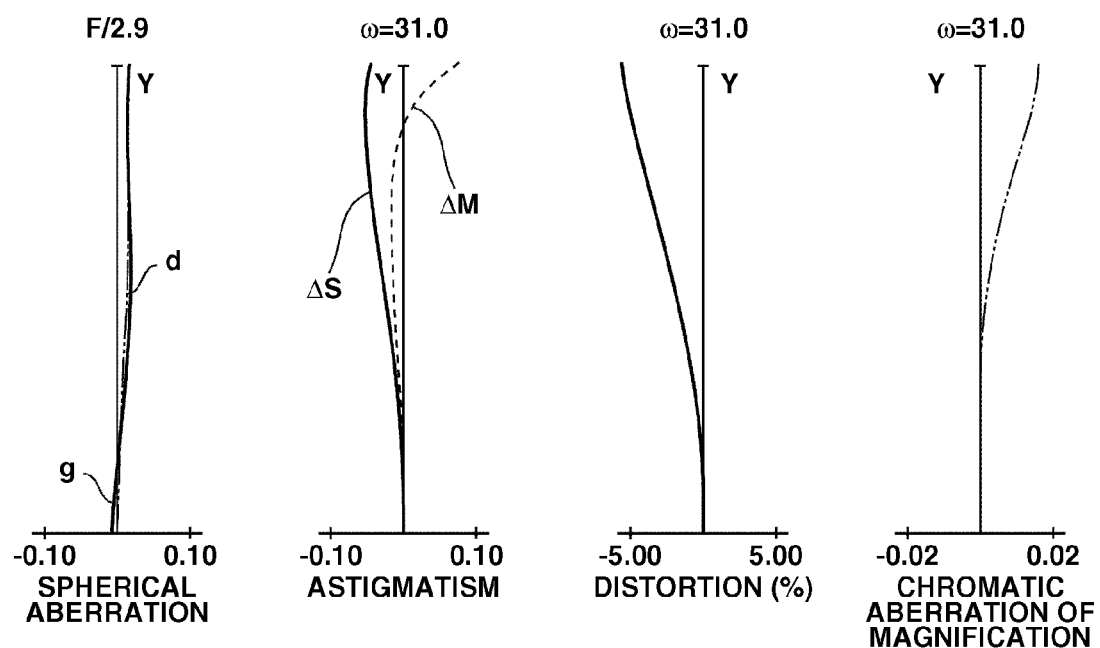
FIG. 5 is a chart illustrating various aberrations at a wide-angle end according to the second exemplary embodiment of the present invention.
Figure 6:
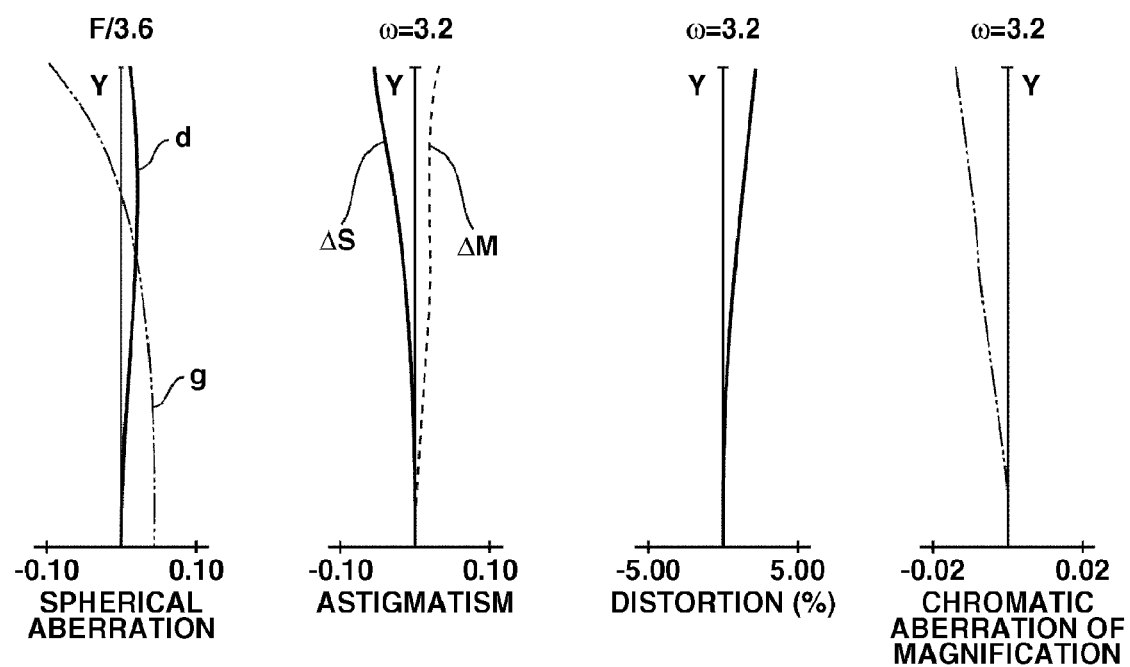
FIG. 6 is a chart illustrating various aberrations at a telephoto end according to the second exemplary embodiment of the present invention.

FIG. 4 is a diagram that illustrates a cross section of the zoom lens at the wide-angle end according to a second exemplary embodiment of the present invention. FIG. 5 and FIG. 6 respectively show an aberration chart at the wide-angle end and at the telephoto end of the zoom lens according to the second exemplary embodiment.

Figure 7:
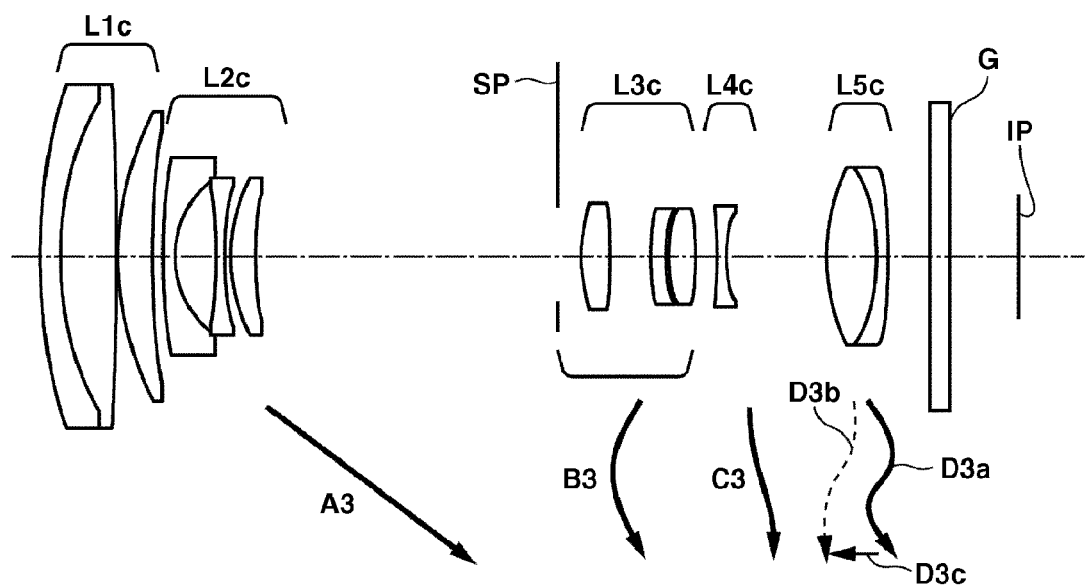
FIG. 7 is a cross section of a zoom lens at a wide-angle end according to a third exemplary embodiment of the present invention.
Figure 8:
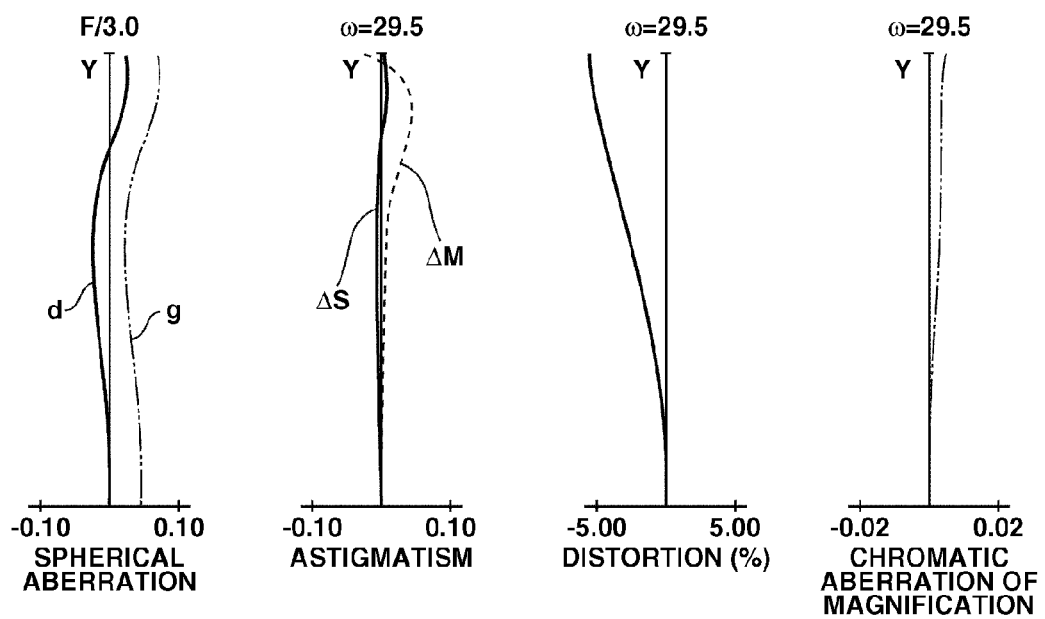
FIG. 8 is a chart illustrating various aberrations at a wide-angle end according to the third exemplary embodiment of the present invention.
Figure 9:
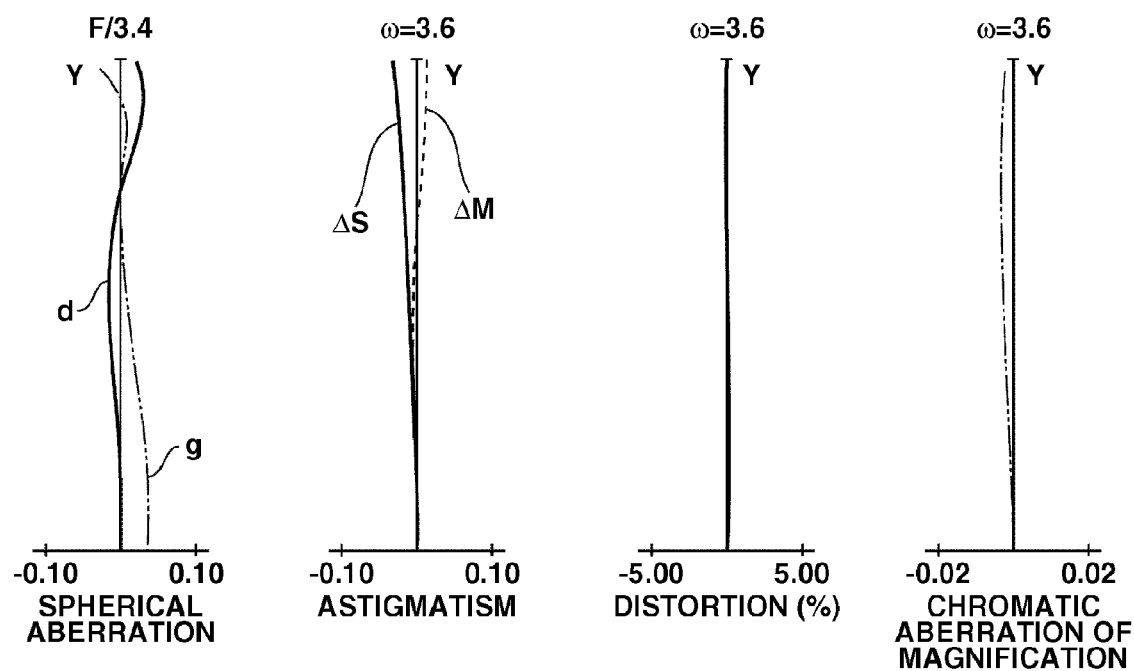
FIG. 9 is a chart illustrating various aberrations at a telephoto end according to the third exemplary embodiment of the present invention.

FIG. 7 is a diagram that illustrates a cross section of the zoom lens at the wide-angle end according to a third exemplary embodiment of the present invention. FIG. 8 and FIG. 9 respectively show an aberration chart at the wide-angle end and at the telephoto end of the zoom lens according to the third exemplary embodiment of the present invention.

Figure 10:
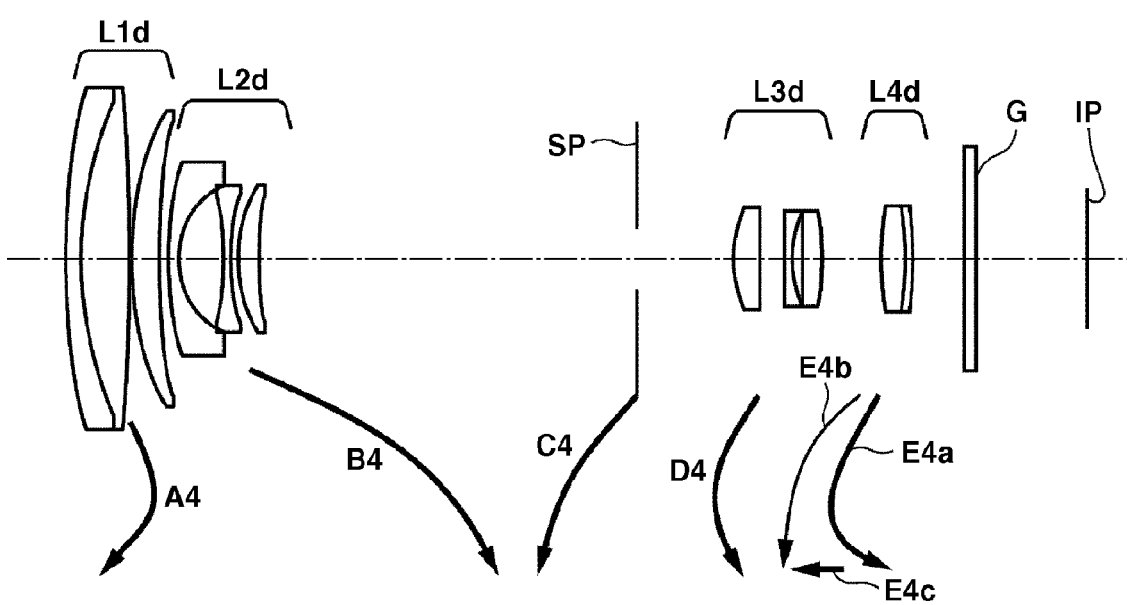
FIG. 10 is a cross section of a zoom lens at a wide-angle end according to a fourth exemplary embodiment of the present invention.
Figure 11:
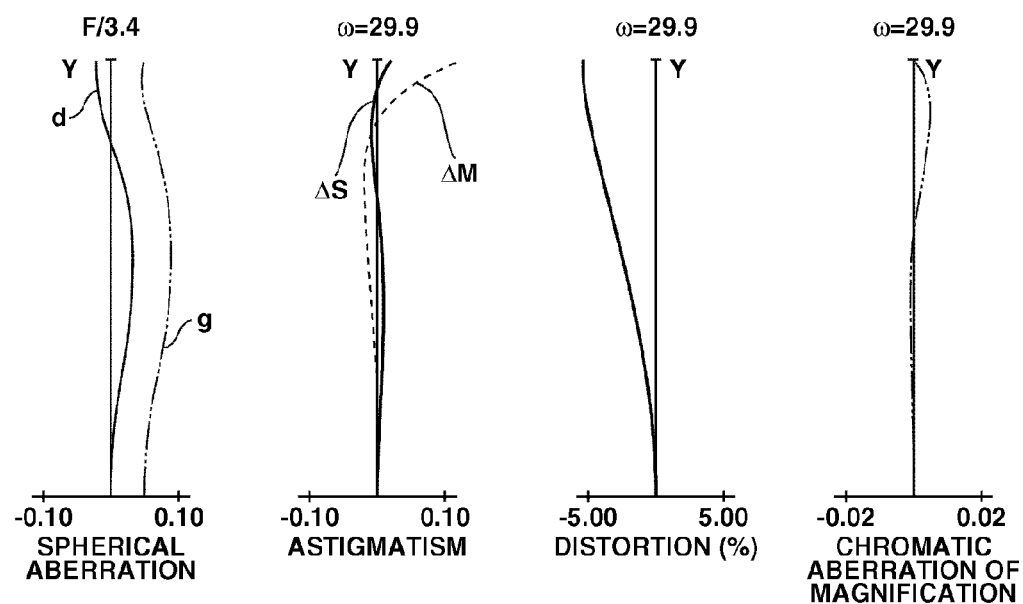
FIG. 11 is a chart illustrating various aberrations at a wide-angle end according to the fourth exemplary embodiment of the present invention.
Figure 12:
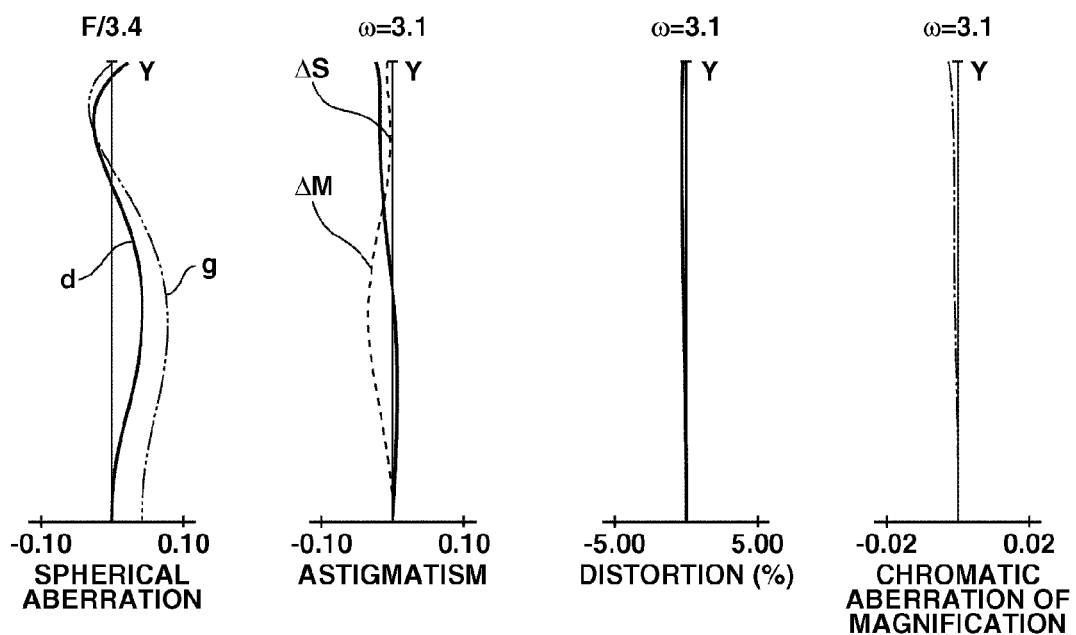
FIG. 12 is a chart illustrating various aberrations at a telephoto end according to the fourth exemplary embodiment of the present invention.

FIG. 10 is a diagram that illustrates a cross section of the zoom lens at the wide-angle end according to a fourth exemplary embodiment of the present invention. FIG. 11 and FIG. 12 respectively show an aberration chart at the wide-angle end and at the telephoto end according to the fourth exemplary embodiment of the present invention.

Figure 13:
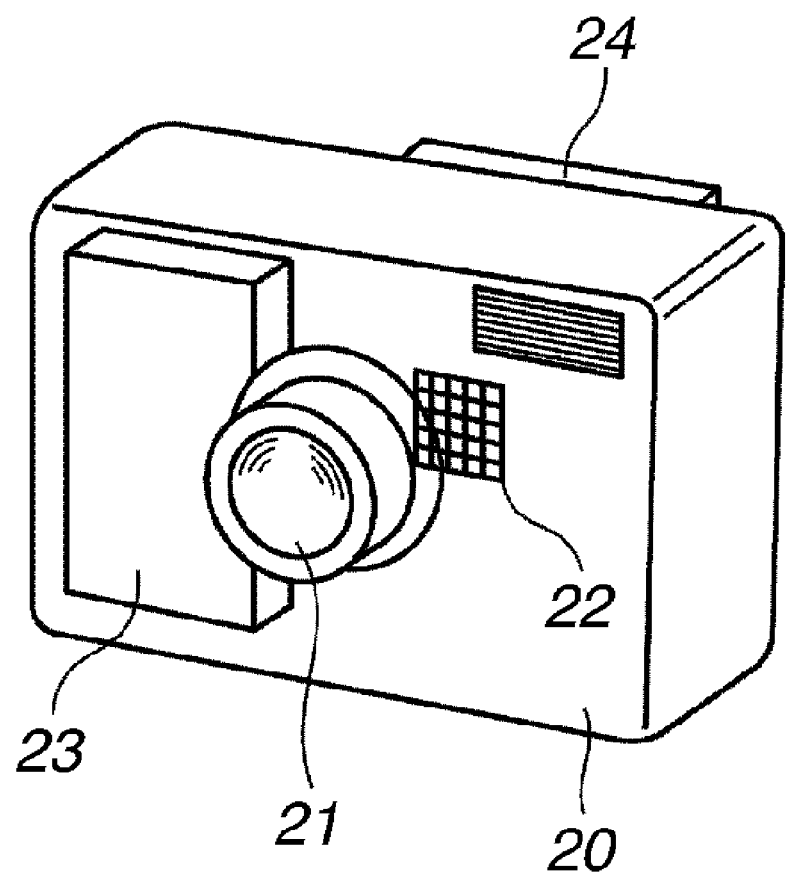
FIG. 13 is a diagram illustrating components of an image pickup apparatus according to an exemplary embodiment of the present invention.

FIG. 13 is a diagram illustrating components of a camera having a zoom lens according to an exemplary embodiment of the present invention.

The zoom lens according to each of the exemplary embodiments is a photographic lens system, which can be used with an image pickup apparatus such as a video camera, a digital camera, and a silver-halide film camera.

In each of the diagrams showing a cross section of a zoom lens, an object side (front side) is shown at a left-hand portion of the drawing, and an image side (back side) is shown at a right-hand portion thereof. Referring to each of the diagrams showing a cross section of a zoom lens, the zoom lens includes the i-th lens unit Li. The zoom lens can further include an aperture stop SP. In each of the diagrams showing a cross section of a zoom lens, "G" denotes an optical block that is equivalent to an optical filter, a face plate, a crystal low-pass filter, and an infrared-ray cut filter, or other type of optical filter as known by one of ordinary skill in the relevant arts.

In addition, in each of diagrams showing a cross section of a zoom lens, "IP" denotes an image plane. The image plane IP is, when the zoom lens is used as a shooting optical system of a video camera or a digital still camera, equivalent to an imaging plane of a solid-state image sensor such as a charge-coupled device (CCD) sensor or a complementary metal-oxide semiconductor (CMOS) sensor. The image plane IP is, when the zoom lens is used as a shooting optical system of a silver-halide film camera, equivalent to a film surface.

In addition, in each of diagrams showing a cross section of a zoom lens, arrows indicate a locus of movement of each lens unit during zooming from the wide-angle end to the telephoto end and a locus of movement of each lens unit during focusing.

In addition, in each of the aberration charts, "d" and "g" respectively denote d-line and g-line light. "ΔM" and "ΔS" respectively denote a meridional image plane and a sagittal image plane. Chromatic aberration of magnification is represented with g-line light. "ω" denotes a semifield angle, and "F" denotes an F number. The Y-axis in the spherical aberration's graph is entrance pupil radius, the Y-axis in the astigmatism's, distortion's and chromatic aberration of magnification's graphs is image height.

Note that in each of the exemplary embodiments, each of the wide-angle end and the telephoto end refers to a zooming position when a lens unit for varying magnification is positioned at each of the ends of a range in which the lens unit can mechanically move along an optical axis.

The zoom lens according to each exemplary embodiment includes a first lens unit L1$a$-$d$ having a positive refractive power, a second lens unit L2$a$-$d$ having a negative refractive power, and a third lens unit L3$a$-$d$ having a positive refractive power, in order from the object side to the image side. In addition, an interval between each of the lens units varies during zooming. In each exemplary embodiment, the zoom lens further includes a subsequent lens unit on the image side of the third lens unit L3$a$-$d$. In the first and the fourth exemplary embodiments, the zoom lens includes a fourth lens unit L4$a,d$ having a positive refractive power. In the second and the third exemplary embodiments, the zoom lens includes a fourth lens unit L4$b,c$ having a negative refractive power and a fifth lens unit L5$b,c$ having a positive refractive power. However, in the present invention, it is not necessary to always provide the zoom lens with the subsequent lens unit. Thus, the zoom lens can at least include three lens units having positive, negative, and positive refractive powers respectively.

The third lens unit L3$a$-$d$ includes at least one optical element GIT made of a solid material that satisfies the following condition.

$$\theta gF - (-1.665 \times 10^{-7} \cdot vd^3 + 5.213 \times 10^{-5} \cdot vd^2 - 5.656 \times 10^{-3} \cdot vd + 0.755) > 0 \quad (1)$$

where "vd" denotes an Abbe number of the solid material used for making the optical element GIT and "θgF" stands for a relative partial dispersion thereof.

The Abbe number vd and the relative partial dispersion θgF are expressed as follows:

$$vd = (nd-1)/(nF-nC)$$

$$\theta gF = (ng-nF)/(nF-nC)$$

where each of "ng", "nF", "nd", and "nC" stands for a refractive index of the material with respect to each of g-line light (having a wavelength of 436 nm), F-line light (having a wavelength of 486 nm), d-line light (having a wavelength of 588 nm), and C-line light (having a wavelength of 656 nm).

The conditional expression (1) represents wavelength dependency of the refractive index of the solid material used as the optical element GIT. As the positive value that the conditional expression (1) represents becomes larger, the effect of correction of chromatic aberration of the material itself becomes better, which is useful for the zoom lens.

If the conditional expression (1) cannot be satisfied, the effect of correction of chromatic aberration is reduced, which is less useful for the zoom lens.

In addition to satisfying the conditional expression (1), the relative partial dispersion θgF can, at the same time, satisfy the following condition:

$$\theta gF - (-1.665 \times 10^{-7} \cdot vd^3 + 5.213 \times 10^{-5} \cdot vd^2 - 5.656 \times 10^{-3} \cdot vd + 1.011) < 0 \quad (1a).$$

With this configuration, chromatic aberration can be corrected without increasing various other aberrations.

In order to further reduce chromatic aberration, the relative partial dispersion θgF can satisfy the following condition:

$$\theta gF - (-1.665 \times 10^{-7} \cdot vd^3 + 5.213 \times 10^{-5} \cdot vd^2 - 5.656 \times 10^{-3} \cdot vd + 0.762) < 0 \quad (1b)$$

Here, for the solid material that constitutes the optical element GIT, a material such as an ultraviolet (UV) curable resin (nd=1.636, vd=22.7) and a material made by dispersing $TiO_2$ into a host polymer such as an UV curable resin, an N-polyvinylcarbazole (nd =1.696, vd=17.7), or a fluorine polymer (nd =1.341, vd =93.8) can be used.

In addition, the zoom lens according to each exemplary embodiment of the present invention satisfies at least one of the following conditions:

$$2 < fGIT/fw < 15 \quad (2)$$

$$0.8 < fGIT/f3 < 8.0 \quad (3)$$

$$0.5 < t3/fw < 4.0 \quad (4)$$

where "fGIT" stands for a focal length of the optical element GIT, "fw" stands for a focal length at the wide-angle end of the zoom lens, "f3" stands for a focal length of the third lens unit L3a-d, and "t3" stands for an interval between the aperture stop SP and the object-side surface of the optical element GIT at the telephoto end. Here, the focal length fGIT of the optical element GIT is a focal length obtained when both of two refractive surfaces of the optical element GIT contact air (refractive index: 1). With this configuration, an effect according to each condition is obtained.

The conditional expression (2) is concerned with a refractive power of the optical element GIT in air. When a material having extraordinary dispersion represented by the conditional expression (1) is used, the effect of correcting chromatic aberration increases as the degree of extraordinary dispersion and the refractive power of the material increase.

If the lower limit value of the conditional expression (2) is exceeded, a curvature of the refractive surface becomes too large, which makes it difficult to correct spherical aberration and coma. On the other hand, if the upper limit value of the conditional expression (2) is exceeded, the refractive power of the optical element GIT becomes too small, which makes it difficult to correct chromatic aberration of the zoom lens at the telephoto end.

The conditional expression (3), just as the conditional expression (2), is concerned with the refractive power of the optical element GIT. More specifically, the conditional expression (3) is concerned with sharing of refractive powers within the third lens unit L3a-d. If the lower limit value of the conditional expression (3) is exceeded, the curvature of the refractive surface of the optical element GIT becomes too large, which makes it difficult to correct spherical aberration and coma with a configuration of the third lens unit L3a-d having a small number of lens elements.

On the other hand, if the upper limit value of the conditional expression (3) is exceeded, the curvature of the refractive surface becomes small. However, when the optical element GIT contacts a material having a refractive index of 1 or higher such as an optical glass instead of contacting air, the power on the refractive surface (refractive power: an inverse of the focal length) becomes small. Accordingly, chromatic aberration cannot be sufficiently corrected.

The conditional expression (4) is concerned with a positional arrangement of the optical element GIT in the zoom lens. By arranging the optical element GIT in the vicinity of the aperture stop SP, where an off-axial ray incident height is low, to satisfy the conditional expression (4), axial chromatic aberration can easily be corrected without increasing chromatic aberration of magnification.

In order to further correct aberration and to decrease an amount of aberration variation during zooming in each exemplary embodiment, the range of the values in the conditional expressions (2) through (4) can be altered as follows:

$$3 < fGIT/fw < 10 \quad (2a)$$

$$1.0 < fGIT/f3 < 6.0 \quad (3a)$$

$$0.8 < t3/fw < 3.5 \quad (4a).$$

In each exemplary embodiment, both of two refractive surfaces of the optical element GIT are in contact with an inorganic material. With this configuration, chromatic aberration can be effectively corrected.

An optical element that satisfies at least one of the above-described conditional expressions can be provided to a lens unit (or to plural lens units) other than the third lens unit L3a-d. With this configuration, chromatic aberration can be more effectively corrected.

In each exemplary embodiment, the third lens unit L3a-d includes two positive lenses and one negative lens. In addition, the third lens unit L3a-d has one or more aspheric surfaces. With this configuration, an aberration variation occurring due to zooming can be corrected.

In addition, in each exemplary embodiment, a part or the whole of the third lens unit L3a-d can be moved for image stabilization in such a way as to have a movement component perpendicular to the optical axis. Thus, image shake, which may occur when the whole zoom lens vibrates, can be corrected or reduced.

As described above, in the zoom lens according to each exemplary embodiment, an optical material other than existing optical glass or fluorite is applied. In addition, an optical element made of the optical material is disposed in an appropriate position in the zoom lens and is provided with an appropriate refractive power. Accordingly, chromatic aberration can be effectively corrected to obtain a high-quality image. In addition, a high-performance zoom lens that can be easier to process than a conventional zoom lens made of glass or fluorite having extraordinary dispersion characteristics can readily be achieved.

Now, a configuration of the zoom lens according to each exemplary embodiment is described below.

First Exemplary Embodiment

The lens configuration according to the first exemplary embodiment shown in FIG. 1 is described below.

Referring to the cross section of the zoom lens shown in FIG. 1, the zoom lens includes a first lens unit L1a having a positive refractive power (optical power: an inverse of a focal length), a second lens unit L2a having a negative refractive power, a third lens unit L3a having a positive refractive power, and a fourth lens unit L4a having a positive refractive power.

During zooming from the wide-angle end to the telephoto end, the first lens unit L1a moves (A1) with a locus convex towards the image side. At this time, the first lens unit L1a moves such that the first lens unit L1a is positioned closer to the object side at the telephoto end than at the wide-angle end. The second lens unit L2a moves (B1) with a locus convex towards the image side to compensate for movement of an image plane caused by the variation of magnification. The third lens unit L3a moves (C1) towards the object side. The fourth lens unit L4a moves (D1a) with a locus convex towards the object side.

In the first exemplary embodiment, a rear focus system, in which focusing is performed by moving the fourth lens unit L4a along the optical axis, is adopted. During focusing from an infinitely distant object to a closest object, the fourth lens unit L4a moves forward as indicated by an arrow D1c.

A full line curve D1a or a dotted line curve D1b for the fourth lens unit L4a indicates a moving locus for compensating for movement of an image plane occurring due to zooming from the wide-angle end to the telephoto end (or vice versa) when focusing on an infinitely distant object or a closet object, respectively.

The fourth lens unit L4a, which is relatively lightweight, can be moved for focusing so that automatic focusing, for example, can be quickly performed. The aperture stop SP moves integrally with the third lens unit L3a during zooming. Thus, the number of lens units, each of which is provided based on whether each lens unit is moved or movable, is reduced, so that a mechanical structure can be simplified.

Because the effective lens diameter of the first lens unit L1a can be relatively large, it is more useful if a less number of lens elements are used for the first lens unit L1a. In this regard, the first lens unit L1a includes one cemented lens obtained by cementing a positive lens and a negative lens or two separate, positive and negative, lens elements. Thus, chromatic aberration occurring in the first lens unit L1a is can be reduced.

The second lens unit L2a includes three separate lens elements, namely, a negative lens having a meniscus shape and whose surface on the object side has a convex shape, a negative lens whose both lens surfaces are in a concave shape, and a positive lens whose surface on the object side has a convex shape. Thus, an aberration variation occurring due to zooming can be reduced, and especially, distortion occurring at the wide-angle end and spherical aberration occurring at the telephoto end can be corrected.

The third lens unit L3a includes positive, positive, and negative lenses, namely, two positive lens elements and one negative lens element, in order from the object side to the image side. The third lens unit L3a has one or more aspheric surfaces. Thus, an aberration variation occurring due to zooming can be corrected.

In addition, in order to correct axial chromatic aberration at the telephoto end, which increases as the zoom ratio becomes higher, a space between the positive lens and the negative lens in the third lens unit L3a is filled with a solid material that is different from a standard optical glass. For example, a resin material (UV curable resin) that satisfies at least one of the above-described conditional expressions is sandwiched with optical glass, so as to improve environmental tolerance and reliability compared to a case where an optical element in which a refractive surface of the resin material is exposed is used.

In addition, the third lens unit L3a can be moved in such a way as to have a movement component perpendicular to the optical axis. Thus, image shake, which may occur when the entire zoom lens vibrates, can be corrected.

With the above configuration, image stabilization can be performed without newly adding an optical member such as a variable angle prism or a lens unit for image stabilization, thus preventing the entire lens system from increasing in size.

Second Exemplary Embodiment

The lens configuration according to the second exemplary embodiment shown in FIG. 4 is described below.

Referring to the cross section of the zoom lens shown in FIG. 4, the zoom lens includes a first lens unit L1b having a positive refractive power, a second lens unit L2b having a negative refractive power, a third lens unit L3b having a positive refractive power, a fourth lens unit L4b having a negative refractive power, and a fifth lens unit L5b having a positive refractive power.

During zooming from the wide-angle end to the telephoto end, the second lens unit L2b moves towards the image side as indicated by an arrow A2. The fifth lens unit L5b moves (C2a) with a locus convex towards the object side. The fourth lens unit L4b moves (B2) with an S-shaped locus. The first lens unit L1b and the third lens unit L3b do not move during zooming. The fifth lens unit L5b moves to compensate for movement of an image plane caused by the variation of magnification and to perform focusing.

Focusing from an infinitely distant object to a closest object at the telephoto end is performed by moving the fifth lens unit L5b towards the object side as indicated by an arrow C2c.

A full line curve C2a or a dotted line curve C2b for the fifth lens unit L5b indicates a moving locus for compensating for movement of an image plane occurring due to zooming from the wide-angle end to the telephoto end (or vice versa) when focusing on an infinitely distant object or a closest object, respectively.

The first lens unit L1b includes one negative lens and two positive lenses. Thus, chromatic aberration occurring at the telephoto end can be effectively corrected.

The second lens unit L2b includes a negative lens having a meniscus shape and whose surface on the image side has a concave shape, a negative lens, a positive lens whose both lens surfaces are in a convex shape, and a negative lens.

The third lens unit L3b includes two positive lenses and one negative lens. An optical element GIT made of a UV curable resin is used in the third lens unit L3b to obtain a similar effect as in the first exemplary embodiment.

The fourth lens unit L4b includes one negative lens.

The fifth lens unit L5b includes, in order from the object side to the image side, a positive lens whose both lens surfaces are in a convex shape, a positive lens whose both lens surfaces are in a convex shape, a negative lens, and a positive lens.

Third Exemplary Embodiment

The lens configuration according to the third exemplary embodiment shown in FIG. 7 is described below. The zoom lens according to the third exemplary embodiment includes five lens units having an arrangement of refractive powers similar to that of the second exemplary embodiment shown in FIG. 4.

During zooming from the wide-angle end to the telephoto end, the second lens unit L2c and the fourth lens unit L4c move (A3 and C3, respectively) towards the image side. The third lens unit L3c moves (B3) with a locus convex towards the object side. The fifth lens unit L5c moves (D3a) with an S-shaped locus.

The lens configuration of the first lens unit L1c according to the third exemplary embodiment is similar to the lens configuration of the first lens unit L1b in the second exemplary embodiment. The lens configuration of the second lens unit L2c according to the third exemplary embodiment is similar to the lens configuration of the second lens unit L2a in the first exemplary embodiment.

The third lens unit L3c includes positive, negative, and positive lenses in order from the object side to the image side. An optical element GIT made of a $TiO_2$ particle dispersion material is used in the third lens unit L3c to effectively correct chromatic aberration.

The fourth lens unit L4c includes one negative lens. The fifth lens unit L5c includes a cemented lens obtained by cementing a positive lens and a negative lens.

In the third exemplary embodiment, a rear focus system, in which focusing is performed by moving the fifth lens unit L5c along the optical axis, is adopted.

Focusing from an infinitely distant object to a closest object at the telephoto end is performed by moving the fifth lens unit L5c forward as indicated by an arrow D3c. A full line curve D3a or a dotted line curve D3b for the fifth lens unit L5c indicates a moving locus for compensating for movement of an image plane occurring due to zooming from the wide-angle end to the telephoto end (or vice versa) when focusing on an infinitely distant object or a closest object, respectively.

Fourth Exemplary Embodiment

The lens configuration according to the fourth exemplary embodiment shown in FIG. 10 is described below. The zoom lens according to the fourth exemplary embodiment includes four lens units having an arrangement of refractive powers similar to that of the first exemplary embodiment shown in FIG. 1.

During zooming from the wide-angle end to the telephoto end, the first lens unit L1d moves (A4) with a locus convex towards the image side. At this time, the first lens unit L1d moves such that the first lens unit L1d is positioned closer to the object side at the telephoto end than at the wide-angle end.

The second lens unit L2d moves (B4) towards the image side. The third lens unit L3d and the fourth lens unit L4d move (D4 and E4a, respectively) with a locus convex towards the object side.

In the four the exemplary embodiment, a rear focus system, in which focusing is performed by moving the fourth lens unit L4d along the optical axis, is adopted as in the first exemplary embodiment.

A technical meaning of each of arrows E4a, E4b, and E4c for the fourth lens unit L4d is similar to each of the arrows in the first exemplary embodiment.

During zooming from the wide-angle end to the telephoto end, the aperture stop SP moves towards the object side independently from the third lens unit L3d. A configuration in which the aperture stop SP is moved independently from the third lens unit L3d is useful in reducing the size of a front lens element. In addition, the aperture stop SP can be stationary. In this case, it is not necessary to move a diaphragm unit. Accordingly, a driving torque from an actuator that drives the lens units during zooming can be set small, which is advantageous in terms of electric power saving.

The first lens unit L1d includes three lens elements, namely, a cemented lens, which is obtained by cementing a negative lens and a positive lens, and a positive lens. With this configuration, chromatic aberration occurring in the first lens unit L1d can be reduced.

The lens configuration of the second lens unit L2d according to the fourth exemplary embodiment is similar to the lens configuration of the second lens unit L2a in the first exemplary embodiment.

The third lens unit L3d includes two positive lenses and one negative lens, namely, positive, negative, and positive lenses in order from the object side to the image side.

In the third lens unit L3d, an optical element GIT made of a $TiO_2$ particle dispersion material is used to effectively correct chromatic aberration. The configuration of the fourth exemplary embodiment is similar to the configuration of the first exemplary embodiment except for the points described above.

Numerical examples 1 through 4 that respectively correspond to the first through the fourth exemplary embodiments are set forth below. In each of the numerical examples 1 through 4, "i" stands for the order of a surface from the object side, "ri" stands for a radius of curvature of the i-th optical surface (an i-th surface), "di" stands for an axial interval between the i-th surface and the (i+1)th surface, "ni" and "vi" respectively stand for a refractive index and an Abbe number of the i-th optical material with respect to d-line light. In addition, "f" stands for the focal length, "F" stands for the F number, and "ω" stands for the semifield angle.

In addition, "X" denotes a displacement from a surface vertex along the optical axis in a position at a height "h" from the optical axis, "R" stands for a paraxial radius of curvature, "k" stands for a conic coefficient, and each of "B", "C", "D", and "E" stands for an aspheric coefficient. The aspheric shape is expressed as $$X = \frac{h^2/R}{1 + \sqrt{1 - (1+k)(h/R)^2}} + Bh^4 + Ch^6 + Dh^8 + Eh^{10} + A'h^3 + B'h^5 + C'h^7.$$

Moreover, "e±XX" stands for "×10$^{\pm XX}$".

In addition, in each exemplary embodiment, a surface closest to the image side (a surface having a radius of curvature of ∞) is a surface that constitutes an optical block G.

Furthermore, the relationship between each conditional expression described above and values in each numerical example is set forth in Table 1. The refractive index with respect to each of d-line light, g-line light, C-line light, and F-line light spectra of the material using the optical element GIT used in each exemplary embodiment is also set forth in Table 1.

Numerical Example 1
f = 5.95-45.93  F = 2.8-4.9  2ω = 61.8°-8.9°

| | | | |
|---|---|---|---|
| r1 = 20.249 | d1 = 1.00 | n1 = 1.84666 | v1 = 23.9 |
| r2 = 14.163 | d2 = 0.30 | | |
| r3 = 14.756 | d3 = 3.60 | n2 = 1.69680 | v2 = 55.5 |
| r4 = 588.446 | d4 = Variable | | |
| r5 = 42.566 | d5 = 0.65 | n3 = 1.88300 | v3 = 40.8 |
| r6 = 6.411 | d6 = 3.21 | | |

-continued

Numerical Example 1
f = 5.95-45.93 F = 2.8-4.9 2ω = 61.8°-8.9°

| | | | |
|---|---|---|---|
| r7 = −16.800 | d7 = 0.60 | n4 = 1.69680 | ν4 = 55.5 |
| r8 = 36.609 | d8 = 0.60 | | |
| r9 = 16.196 | d9 = 1.80 | n5 = 1.92286 | ν5 = 18.9 |
| r10 = 104.247 | d10 = Variable | | |
| r11 = Stop | d11 = 0.70 | | |
| r12 = 8.853 | d12 = 2.30 | n6 = 1.58313 | ν6 = 59.4 |
| r13 = −17.423 | d13 = 0.20 | | |
| r14 = 4.563 | d14 = 1.90 | n7 = 1.48749 | ν7 = 70.2 |
| r15 = 13.129 | d15 = 0.50 | n8 = 1.63555 | ν8 = 22.7 |
| r16 = −106.190 | d16 = 0.70 | n9 = 1.80518 | ν9 = 25.4 |
| r17 = 3.601 | d17 = Variable | | |
| r18 = 8.977 | d18 = 2.00 | n10 = 1.48749 | ν10 = 70.2 |
| r19 = 116.182 | d19 = Variable | | |
| r20 = ∞ | d20 = 1.30 | n11 = 1.51633 | ν11 = 64.1 |
| r21 = ∞ | | | |

| | Focal Length | | |
|---|---|---|---|
| Variable Space | 5.95 | 16.53 | 45.93 |
| d4 | 0.40 | 9.14 | 16.02 |
| d10 | 18.17 | 6.62 | 1.99 |
| d17 | 7.02 | 8.50 | 19.45 |
| d19 | 2.00 | 5.77 | 2.40 |

Aspheric Coefficients r12: k=−1.71740 B=1.64017E-4 C=8.02840E-7 D=1.88795E-8 r13: k=−1.65387E-1 B=1.79023E-4 C=−1.56975E-6 D=1.04720E-7

Numerical Example 2
f = 9.2-100.0 F = 2.9-3.6 2ω= 62.0°-6.3°

| | | | |
|---|---|---|---|
| r1 = 92.739 | d1 = 2.20 | n1 = 1.84666 | ν1 = 23.8 |
| r2 = 47.511 | d2 = 7.70 | n2 = 1.51633 | ν2 = 64.1 |
| r3 = −501.575 | d3 = 0.40 | | |
| r4 = 43.329 | d4 = 4.30 | n3 = 1.69680 | ν3 = 55.5 |
| r5 = 150.256 | d5 = Variable | | |
| r6 = 238.653 | d6 = 1.30 | n4 = 1.80400 | ν4 = 46.6 |
| r7 = 12.713 | d7 = 5.20 | | |
| r8 = −47.834 | d8 = 1.00 | n5 = 1.80400 | ν5 = 46.6 |
| r9 = 92.869 | d9 = 0.40 | | |
| r10 = 21.690 | d10 = 4.20 | n6 = 1.84666 | ν6 = 23.8 |
| r11 = −63.517 | d11 = 0.95 | n7 = 1.83481 | ν7 = 42.7 |
| r12 = 34.805 | d12 = Variable | | |
| r13 = Stop | d13 = Variable | | |
| r14 = 42.754 | d14 = 2.60 | n8 = 1.69680 | ν8 = 55.5 |
| r15 = −37.933 | d15 = 0.50 | | |
| r16 = 55.425 | d16 = 2.50 | n9 = 1.48749 | ν9 = 70.2 |
| r17 = −38.721 | d17 = 0.90 | n10 = 1.63555 | ν10 = 22.7 |
| r18 = −18.542 | d18 = 0.80 | n11 = 1.84666 | ν11 = 23.8 |
| r19 = −104.088 | d19 = Variable | | |
| r20 = −33.970 | d20 = 1.20 | n12 = 1.58313 | ν12 = 59.4 |
| r21 = 627.516 | d21 = Variable | | |
| r22 = 24.892 | d22 = 4.00 | n13 = 1.69680 | ν13 = 55.5 |
| r23 = −61.502 | d23 = 0.20 | | |
| r24 = 18.234 | d24 = 5.00 | n14 = 1.49700 | ν14 = 81.5 |
| r25 = −29.501 | d25 = 0.80 | n15 = 1.80610 | ν15 = 33.3 |
| r26 = 21.561 | d26 = 2.00 | | |
| r27 = −63.865 | d27 = 2.10 | n16 = 1.58313 | ν16 = 59.4 |
| r28 = −33.750 | d28 = Variable | | |
| r29 = ∞ | d29 = 3.50 | n17 = 1.51633 | ν17 = 64.2 |
| r30 = ∞ | | | |

| | Focal Length | | |
|---|---|---|---|
| Variable Space | 9.15 | 30.19 | 99.98 |
| d5 | 1.00 | 25.16 | 41.00 |
| d12 | 41.86 | 17.70 | 1.86 |
| d13 | 2.86 | 2.86 | 2.86 |
| d19 | 3.57 | 14.11 | 19.01 |
| d21 | 24.04 | 10.46 | 8.71 |
| d28 | 4.00 | 7.04 | 3.89 |

Aspheric Coefficients r20: k=−7.82015 B=−1.93647E-5 C=2.08784E-7 D=−2.36483E-9 r28: k=−1.58559 B=6.33790E-5 C=−6.19819E-8 D=−3.59058E-10

Numerical Example 3
f = 6.3-57.0 F = 3-3.4 2ω = 58.9°-7.2°

| | | | |
|---|---|---|---|
| r1 = 35.560 | d1 = 1.30 | n1 = 1.80518 | ν1 = 25.4 |
| r2 = 20.807 | d2 = 3.80 | n2 = 1.48749 | ν2 = 70.2 |
| r3 = −413.620 | d3 = 0.10 | | |
| r4 = 20.191 | d4 = 2.40 | n3 = 1.60311 | ν3 = 60.6 |
| r5 = 77.716 | d5 = Variable | | |
| r6 = 39.792 | d6 = 0.70 | n4 = 1.88300 | ν4 = 40.8 |
| r7 = 6.059 | d7 = 2.83 | | |
| r8 = −34.143 | d8 = 0.60 | n5 = 1.69680 | ν5 = 55.5 |
| r9 = 19.132 | d9 = 0.40 | | |
| r10 = 11.073 | d10 = 1.70 | n6 = 1.92286 | ν6 = 18.9 |
| r11 = 29.453 | d11 = Variable | | |
| r12 = Stop | d12 = 1.50 | | |
| r13 = 11.762 | d13 = 2.00 | n7 = 1.69350 | ν7 = 53.2 |
| r14 = −40.753 | d14 = 3.00 | | |
| r15 = 30.184 | d15 = 0.60 | n8 = 1.84666 | ν8 = 23.9 |
| r16 = 8.205 | d16 = 0.27 | | |
| r17 = 12.653 | d17 = 1.70 | n9 = 1.35217 | ν9 = 64.0 |
| r18 = −21.591 | d18 = Variable | n10 = 1.60311 | ν10 = 60.6 |
| r19 = −30.483 | d19 = 0.70 | n11 = 1.48749 | ν11 = 70.2 |
| r20 = 8.689 | d20 = Variable | | |
| r21 = 13.556 | d21 = 3.50 | n12 = 1.80400 | ν12 = 46.6 |
| r22 = −11.149 | d22 = 0.60 | n13 = 1.84666 | ν13 = 23.9 |
| r23 = −39.609 | d23 = Variable | | |
| r24 = ∞ | d24 = 1.30 | n14 = 1.51633 | ν14 = 64.1 |
| r25 = ∞ | | | |

| | Focal Length | | |
|---|---|---|---|
| Variable Space | 6.33 | 18.99 | 56.99 |
| d5 | 0.70 | 10.38 | 19.17 |
| d11 | 20.48 | 7.67 | 1.48 |
| d18 | 1.50 | 4.60 | 1.98 |
| d20 | 6.74 | 6.60 | 9.62 |
| d23 | 3.00 | 3.17 | 0.17 |

Aspheric Coefficients r14: k=−1.69741E2 B=−1.57759E-4 C=1.38087E-5 D=−3.93944E-7

Numerical Example 4
f = 6.2-66.0 F = 3.4-3.4 2ω = 59.8°-6.2°

| | | | |
|---|---|---|---|
| r1 = 70.122 | d1 = 1.50 | n1 = 1.84666 | ν1 = 23.9 |
| r2 = 37.674 | d2 = 4.60 | n2 = 1.48749 | ν2 = 70.2 |

-continued

Numerical Example 4
f = 6.2-66.0 F = 3.4-3.4 2ω = 59.8°-6.2°

| | | | |
|---|---|---|---|
| r3 = −271.830 | d3 = 0.20 | | |
| r4 = 32.170 | d4 = 2.85 | n3 = 1.77250 | ν3 = 49.6 |
| r5 = 78.377 | d5 = Variable | | |
| r6 = 35.934 | d6 = 0.90 | n4 = 1.83400 | ν4 = 37.2 |
| r7 = 7.800 | d7 = 4.32 | | |
| r8 = −34.640 | d8 = 0.75 | n5 = 1.60311 | ν5 = 60.6 |
| r9 = 22.616 | d9 = 0.70 | | |
| r10 = 14.144 | d10 = 2.00 | n6 = 1.92286 | ν6 = 18.9 |
| r11 = 30.965 | d11 = Variable | | |
| r12 = Stop | d12 = Variable | | |
| r13 = 11.405 | d13 = 2.70 | n7 = 1.58313 | ν7 = 59.4 |
| r14 = −57.639 | d14 = 2.30 | | |
| r15 = 140.161 | d15 = 0.70 | n8 = 1.83400 | ν8 = 37.2 |
| r16 = 9.430 | d16 = 0.95 | n9 = 1.35217 | ν9 = 64.0 |
| r17 = 115.259 | d17 = 1.60 | n10 = 1.60311 | ν10 = 60.6 |
| r18 = −55.316 | d18 = Variable | | |
| r19 = 40.182 | d19 = 2.50 | n11 = 1.69680 | ν11 = 55.5 |
| r20 = −21.790 | d20 = 0.60 | n12 = 1.84666 | ν12 = 23.9 |
| r21 = −47.741 | d21 = Variable | | |
| r22 = ∞ | d22 = 1.30 | n13 = 1.49831 | ν13 = 65.1 |
| r23 = ∞ | | | |

| | Focal Length | | |
|---|---|---|---|
| Variable Space | 6.16 | 20.18 | 65.99 |
| d5 | 0.80 | 19.33 | 33.94 |
| d11 | 36.49 | 11.02 | 1.00 |
| d12 | 10.29 | 11.51 | 13.89 |
| d18 | 6.02 | 4.22 | 9.59 |
| d21 | 9.79 | 15.51 | 10.09 |
| d23 | 9.79 | 9.79 | 9.79 |

Aspheric Coefficients r13: k=−8.63724E−1 B=1.36448E−4 C=3.78036E−5 D=5.47074E−7

E=−1.88292E−9 A'=−8.59213E−5 B'=−1.01902E−4 C'=−6.93498E−6

TABLE 1

Refractive Index of Optical Element GIT

| | Numerical Example | | | |
|---|---|---|---|---|
| Condition | 1 | 2 | 3 | 4 |
| nd | 1.63555 | 1.63555 | 1.35217 | 1.35217 |
| ng | 1.67532 | 1.67532 | 1.35954 | 1.35954 |
| nC | 1.62807 | 1.62807 | 1.35061 | 1.35061 |
| nF | 1.65604 | 1.65604 | 1.35611 | 1.35611 |
| (1) Value in Subject of Conditional Expression (1) | 0.038 | 0.038 | 0.061 | 0.061 |
| (2) fGIT/fw | 3.1 | 6.0 | 9.8 | 4.9 |
| (3) fGIT/f3 | 1.5 | 2.0 | 5.3 | 1.1 |
| (4) t3/fw | 0.9 | 0.9 | 1.1 | 3.2 |

Now, an exemplary embodiment of a digital still camera that uses a zoom lens according to each exemplary embodiment as a shooting optical system is described below.

Referring to FIG. 13, the digital still camera includes a digital camera body 20 and a shooting optical system 21. The shooting optical system 21 includes a zoom lens according to any of the first to the fourth exemplary embodiments described above. The digital camera body 20 includes a solid-state image sensor (photoelectric conversion element) 22, such as a CCD sensor or a CMOS sensor, configured to receive light forming an object image via the shooting optical system 21.

The digital camera body 20 further includes a memory 23 configured to record information corresponding to an object image photoelectrically converted by the solid-state image sensor 22. The digital camera body 20 further includes a viewfinder 24 configured to allow a user to observe an object image formed on the solid-state image sensor 22. The viewfinder 24 includes a liquid crystal display panel.

With a zoom lens according to an exemplary embodiment of the present invention applied to an image pickup apparatus, such as a digital camera, an image pickup apparatus having a high optical performance can be implemented.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2006-050269 filed Feb. 27, 2006, which is hereby incorporated by reference herein in its entirety.

What is claimed is:

1. A zoom lens comprising, in order from an object side to an image side:

a first lens unit having a positive refractive power;

a second lens unit having a negative refractive power; and a third lens unit having a positive refractive power, wherein an interval between the first lens unit and the second lens unit and an interval between the second lens unit and the third lens unit vary during zooming, wherein the third lens unit includes an optical element made of a solid material having an Abbe number (νd) and a relative partial dispersion (θgF) satisfying the following condition:

$$\theta gF-(-1.665\times10^{-7}\cdot\nu d3+5.213\times10^{-5}\cdot\nu d^2-5.656\times10^{-3}\cdot\nu d+0.755)>0.$$

2. The zoom lens according to claim 1, wherein a focal length of the optical element when both of two refractive surfaces of the optical element contact air (fGIT) and a focal length of the zoom lens at a wide-angle end (fw) satisfy the following condition:

$$2<fGIT/fw<15.$$

3. The zoom lens according to claim 1, wherein a focal length of the optical element when both of two refractive surfaces of the optical element contact air (fGIT) and a focal length of the third lens unit (f3) satisfy the following condition:

$$0.8<fGIT/f3<8.0.$$

4. The zoom lens according to claim 1, further comprising an aperture stop, wherein a focal length of the zoom lens at a wide-angle end (fw) and an interval between the aperture stop and a surface of the optical element on the object side at a telephoto end (t3) satisfy the following condition:

$$0.5<t3/fw<4.0.$$

5. The zoom lens according to claim 1, wherein both of two refractive surfaces of the optical element contact an inorganic material.

6. The zoom lens according to claim 1, wherein the zoom lens comprises, in order from the object side to the image side, the first lens unit, the second lens unit, the third lens unit, and a subsequent lens unit.

7. The zoom lens according to claim 6, wherein the subsequent lens unit includes a fourth lens unit having a positive refractive power.

8. The zoom lens according to claim 6, wherein the subsequent lens unit includes, in order from the object side to the image side, a fourth lens unit having a negative refractive power and a fifth lens unit having a positive refractive power.

9. The zoom lens according to claim 1, wherein the zoom lens is configured to form an image on a photoelectric conversion element.

10. An image pickup apparatus comprising:
the zoom lens according to claim 1; and
a photoelectric conversion element configured to receive an image formed by the zoom lens.

11. The zoom lens according to claim 1, wherein the Abbe number and relative partial dispersion of the optical element additionally satisfies:

$$\theta gF-(-1.665\times10^{-7}\cdot vd3+5.213\times10^{-5}\cdot vd^2-5.656\times10^{-3}\cdot vd+1.011)<0.$$

12. The zoom lens according to claim 1, wherein the third lens unit includes two positive lenses and one negative lens.

13. The zoom lens according to claim 1, wherein the third lens unit can move perpendicular to an optical axis of the zoom lens.

14. The zoom lens according to claim 1, wherein the optical element is not made of fluorite.

* * * * *